United States Patent [19]

Reardanz et al.

[11] B 4,001,449
[45] Jan. 4, 1977

[54] INTERMEDIATE MOISTURE ANIMAL FOOD HAVING IDENTIFIABLE MEAT AND EGG COMPONENTS

[75] Inventors: Eugene H. Reardanz; Jerry N. Boudreau, both of Kankakee, Ill.

[73] Assignee: General Foods Corporation, White Plains, N.Y.

[22] Filed: Feb. 12, 1974

[21] Appl. No.: 441,789

[44] Published under the second Trial Voluntary Protest Program on March 30, 1976 as document No. B 441,789.

[52] U.S. Cl. ................ 426/332; 426/532; 426/558; 426/614; 426/630; 426/805; 426/274; 426/646
[51] Int. Cl.$^2$ .............. A23K 1/14; A23L 1/32
[58] Field of Search .......... 426/146, 211, 805, 274, 426/275, 346, 272, 558, 614, 646, 332, 658, 321, 330.1, 532, 630

[56] References Cited

UNITED STATES PATENTS

| | | | |
|---|---|---|---|
| 3,073,704 | 1/1963 | Rivoche | 426/211 |
| 3,202,514 | 8/1965 | Burgess et al. | 426/805 |
| 3,380,832 | 4/1968 | Bone | 426/250 |
| 3,482,985 | 12/1969 | Burgess et al. | 426/250 |
| 3,561,972 | 2/1971 | Dodge et al. | 426/129 |
| 3,615,652 | 10/1971 | Burgess et al. | 426/324 |
| 3,793,466 | 2/1974 | Hawkins et al. | 426/274 |
| 3,808,341 | 4/1974 | Rongey et al. | 426/211 |

*Primary Examiner*—Norman Yudkoff
*Assistant Examiner*—Curtis P. Ribando
*Attorney, Agent, or Firm*—Thaddius J. Carvis; Bruno P. Struzzi

[57] ABSTRACT

A meat-based, intermediate-moisture animal food is disclosed containing egg as an essential ingredient. The product is formulated by a process designed to preserve the identity and discernible character of the egg component.

9 Claims, No Drawings

INTERMEDIATE MOISTURE ANIMAL FOOD HAVING IDENTIFIABLE MEAT AND EGG COMPONENTS

BACKGROUND OF THE INVENTION

This invention relates to animal foods and more particularly to animal foods of the intermediate moisture variety.

Intermediate-moisture animal foods are known in the art and are characterized by moisture contents of from about 15 to 30% by weight and by their ability to remain shelf stable and resistant to bacteriological decomposition even after prolonged periods of storage without resort to sterilization, refrigeration, or special packaging techniques. Examples of such products and processes for producing them may be found in U.S. Pat. Nos. 3,202,514, 3,482,985 and 3,615,652.

These patents represent a significant advance in the animal food art. Owing to their higher moisture contents they are generally of much higher palatability than dry animal foods which are typically dried to a stable moisture content below about 10 percent by weight, and indeed approach the palatability achieved by canned animal foods which generally have a moisture content exceeding 75 percent by weight. However, owing to their ability to remain shelf-stable without resort to sterilization or refrigeration, these intermediate-moisture products have a significant processing and convenience advantage over canned products. Further, the high degree of palatability achieved at moisture contents significantly below those of canned products allows for the provision of nutritious, ration-balancing components.

The prior art has long desired to further improve the palatability nutrition and appeal of such intermediate-moisture animal foods. One means for achieving this result is by the overt addition of ingredients or flavorants for which animals are known to display a liking. Thus, for example, in the case of dogs, cheese has been known to be added to intermediate-moisture products to improve the palatability thereof.

Certain problems have, however, hampered the utilization of such techniques to improve the palatability of intermediate-moisture animal foods. Firstly, since the added palatability improver necessarily replaces or partly replaces other components of the food, the added palatability is often at the expense of nutritional ingredients desirably present in order to achieve a full balanced ration for the animal. Secondly, it is most desirable that the palatability improver be noticeable and distinct so as to enhance the appeal not only to the animal but, as is often an extremely important consideration, to the purchasing public. Thus, prior art processes involving the incorporation of flavorants or other palatability improvers have often failed to achieve success due to the visual indistinguishability of such products from products without such improvers.

Accordingly, it is a primary object of this invention to prepare shelf-stable intermediate-moisture animal food having improved palatability.

It is a further object of this invention to achieve this palatability improvement by the use of an ingredient which does not detract from the overall nutritional value of the animal food.

Yet another object of this invention is to prepare such an animal food by a process which results in the palatability improver being a readily distinguishable portion of the animal food product.

These and other objects will be apparent from the description and claims which follow.

SUMMARY OF THE INVENTION

These and other objects are achieved by the provision of egg in the meat-based, intermediate-moisture animal food product. The animal food product of this invention is highly palatable due in part to the presence of egg therein and is fully nutritional since the egg in and of itself contributes protein and other nutritional aids more than sufficient to compensate for the lost nutritional value of ingredients which the egg replaces.

Further the meat and egg animal food of this invention is prepared according to a process which allows the egg to remain discernible in the final product. The process of this invention involves the preparation of two separate components which are blended together in desired ratios to achieve the final product. Thus, an intermediate-moisture meat portion is separately prepared which is blended with a separately prepared intermediate-moisture egg portion to achieve the final meat and egg animal food composition. This independent processing technique allows the final product to display a noticeable, distinct, recognizable egg portion.

DETAILED DESCRIPTION OF THE INVENTION

In accordance with the present invention, there are produced separate, distinct intermediate-moisture products which are then combined to achieve a final unique animal food product containing meat and egg.

The meat portion of the animal food product is formulated and produced substantially in accordance with the procedure described in U.S. Pat. No. 3,202,514 to Burgess, et al which patent is expressly incorporated herein by reference. The meat portion is primarily based on proteinaceous meaty materials. The term "proteinaceous meaty material" refers to the group consisting of meat, meat by-products and meat meal as well as mixtures of these. The term "meat" is understood to apply not only to the flesh of cattle, swine, sheep and goats, but also horses, whale and other mammals, poultry and fish. The term "meat by-products" is intended to refer to those non-rendered parts of the carcass of slaughtered animals including but not restricted to mammals, poultry and the like and including such constituents as are embraced by the term "meat by-products" in the Definitions of Feed Ingredients published by the Association of American Feed Control Officials, Incorporated. Likewise, the term "meat meal" refers to the finely ground, dry rendered residue embraced by the term in the aforesaid official definition of the Association of American Feed Control Officials, Incorporated. Indeed, the terms "meat," "meat by-products," and "meat meal" are understood to apply to all of those animal, poultry and marine products defined by said association.

The meat portion of the product of this invention will optionally, though preferably contain additional sources of protein other than that derived from the proteinaceous meaty material. These ingredients may be broadly termed as a vegetable protein source or concentrate and a ration-balancing protein supplement.

The term "vegetable protein source or concentrate" applies to oil seeds and legumes; as well as the oil-expressed or extracted meals and cakes and protein isolates thereof recovered by acid or alkali digestion and precipitation; typical of such vegetable protein sources are soybean, soybean meal, cotton seed meal, peanuts, peanut meal, etc., all of which terms are well understood and similarly defined or understood by said association.

The term "ration-balancing protein supplement" is intended principally to refer to milk products as defined by said association and hence includes such additives as dried buttermilk, dried skimmed milk, dried whole whey, casein and cheese rind, although it also includes yeast as that term is defined by said association and hence refers to such materials as distillers' dried yeast, primary dried yeast, irradiated dried yeast, brewers' dried yeast and torula dried yeast. However, the term protein supplements is not to be understood as restricted to the aforesaid definition.

The meat portion is formulated to achieve a substantially neutral pH, typically 6.0 to 8.0 and preferably from 6.0 to 7.0. In general, it will be found that the various components of the meat portion when formulated and mixed will inherently result in the desired pH; hence, any overt addition of acid or alkali is not normally contemplated.

The meat portion is formulated to achieve a final product moisture content of from 15 to 30 percent by weight. Generally this amount of moisture will result from the moisture of the proteinaceous meaty materials but it is to be understood that the overt addition of sufficient water is not excluded by this invention. Preferably, the moisture content will be from 20 to 30 percent and most preferably from 25–27 percent by weight.

The meat portion of the egg and meat product of this invention is stabilized against bacteriological decomposition and spoilage through the utilization of a preservative system such as described in U.S. Pat. No. 3,202,514. Water soluble solutes are dispersed throughout the matrix of proteinaceous meaty materials and other ingredients so as to effect a rise in the osmotic pressure of the aqueous phase of the composition sufficient to impart bacteriostasis.

Sugar is employed as the principal source of water soluble solids and may range upwardly in weight percentage of the composition anywhere from 15 percent to 35 percent depending upon the particular sugar or sugar mixture relied upon to offer the desired bacteriostatic protection. As the moisture content of the product increases in the intermediate moisture range, the level of a given sugar will correspondingly increase in order to maintain a sufficient bacteriostatic effect. The level of sugar chosen will also vary depending upon the presence and level of auxiliary water soluble solids also offering a similar increase in osmotic pressure to the aqueous phase of the composition; thus, a variety of low average molecular weight materials may be included as part of the water soluble solids in the aqueous phase and will augment the sugars in their role of providing sufficient osmotic pressure to prevent bacterial decomposition.

The term "sugar" as it is employed in the present context is to be understood as meaning any of a number of useful saccharide materials which are capable of increasing the osmotic pressure of the water in which they are dissolved and thereby giving rise to the requisite bacteriostatic effect. Included in the list of useful sugars are the non-reducing and reducing water-soluble mono-saccharides and the reducing and non-reducing polysaccharides and their degradation products; e.g., pentoses, including aldopentoses, methylpentoses, keptopentoses, like xylose and arabinose; a deoxyaldose like rhamnose, hexoses and reducing saccharides such as aldo hexoses like glucose, galactose and mannose; the ketohexoses, like fructose and sorbose; disaccharides, like lactose and maltose; non-reducing disaccharides such as a sucrose and other polysaccharides such as dextrin and raffinose; and hydrolyzed starches which contain as their constituents oligosaccharides. The sugars should be of a low molecular weight so as to offer a substantial effect in increasing the osmotic pressure of the sugar solution.

The term "water soluble solids" is understood, therefore, to apply to any animal feed or feed additive material which is substantially soluble in water at room temperature or at temperatures comparable to those practiced in processing the ingredients of the dog food composition. Included in the class of water soluble non-sugar solids that can be employed are certain inorganic salts used at a level compatible with palatability requirements, e.g., sodium chloride and potassium chloride. Indeed, certain compounds like the diols and polyols, propylene glycol, sorbitol, glycerol and the like which have another function, i.e., as anti-mycotic and/or texturizers may also be relied upon to afford the soluble solids employed in the aqueous phase for bacteriostatic protection; the propylene glycol is prominent in this respect since it is capable of serving a multiple role as mold inhibitor and plasticizing humectant for texture as well as contributing to the water soluble solids of the aqueous phase; for these reasons propylene glycol is most preferred as an additive for use in combination with the matrix materials.

The relative weight percent of said water soluble solids to the moisture content of the total product, when initially incorporated into the product during its manufacture and preparatory to packaging determines the ultimate functionality of the solids in providing the requisite bacteriostatic effect. The level of water soluble solids may be varied as may the level of moisture initially incorporated within the aforesaid respective ranges. However, in varying these levels the relationship of the water soluble solids in solution to the water should be controlled so as to afford the desired osmotic pressure. A good rule to observe in this connection is to be sure that the weight of water soluble solids available for solution is at least equal to the weight of the moisture present, although in some cases it is found that a lower level of water soluble solids will afford some protection against microbiological decomposition provided an equivalent degree of osmotic pressure is available to protect the matrix material. In any event, it will be found that the level of sugar that should be employed under the conditions of the present invention will constitute a major percent by weight of the water soluble solids.

The meat portion of the egg and meat product of this invention will also preferably contain texturizers.

The term "texturizer" is to be understood as covering a broad class of materials capable of modifying the tendency of dissolved sugar solids contained herein and the hydrated matrix materials to alter in their desired product softness and plasticity. Preferable among the various texturizers which will find application in accordance with this invention are humectants like sorbitol, propylene glycol and like polyhydric materials which are hydrophilic in character. Other texturizers which may be employed in accordance with this invention are sugars such as invert sugar which contains dextrose and levulose, as well as maltose and corn syrup solids, which are per se difficulty crystallizable and which function in such manner in solutions containing large quantities of other sugars like sucrose so as to retard or control crystallization. Also of use in maintaining a desirable moist plastic condition in the composition, that is, one in excess of 15% and less than 30% moisture, are the class of hydrophilic-lipophilic emulsifying agents typified by the partial esters of polyols and higher fatty acids like glycerol and propylene glycol mono- and di-esters of the saturated and unsaturated fatty acids such as stearic and palmitic, which emulsifiers it has been observed also retain the moisture in the product to a degree which materially offsets the tendency of the product to undergo a change of texture; the precise mechanism whereby such emulsifying agents act in the present system is not fully understood but it is found that these emulsifying agents do serve to emulsify the fat phase of the meat constituents and apparently thereby avoid a loss of soft texture during the anticipated storage and use of the product.

Additional ingredients in the preferred product will include: desired flavors including meat fat, salt, etc.; nutrients including vitamins, minerals, etc.; and a red dye, or other appropriate dye may be employed to give the desired color. The flavor may constitute up to 2 percent – 3 percent by weight of the product, and nutrients and dye, in total, will comprise about 1 percent or less.

Since the product of this invention, when prepared in the manner herein disclosed, is characterized by its substantially complete resistance to bacterial decomposition, but can serve as a host for yeasts and mold (particularly when packed aerobically), the animal foods of the invention will most preferably have an antimycotic agent incorporated at a sufficient level to prevent the growth of such organisms. Sorbate salts such as potassium sorbate as well as sorbic acid can be used either separately or in combination. Propylene glycol which may be used along or with other humectants like sorbital to impart a degree of product softness or tenderness has also been found to serve as an anti-mycotic. Other anti-mycotic agents will be apparent to those skilled in the art. The amount of anti-mycotic agent added is selected so as to produce the desired results and will constitute a minor proportion of the product, say from about 0.1 percent to about 2.5 percent of the total weight, depending on the particular anti-mycotic and the particular product composition, although even lower levels in the order of 50 p.p.m. can be employed in the case of some anti-mycotics as pimaricin. Potassium sorbate in a water solution can be sprayed into the surface of the animal food or the food can be dipped in this solution; other anti-mycotics lend themselves to such surface application as esters of the parabens (para-hydroxy benzoate) such as propyl and methyl parabens (methyl parahydroxy benzoate). Cellophane and other enwrapments for the food can be spray coated with a sorbic acid solution but impregnation or dusting with sorbic acid or potassium sorbate is preferred. Anti-mycotics which can generally be used are benzoic acid, sodium benzoates, proprionic acid, sodium and calcium proprionate, sorbic acid, potassium and calcium sorbate, propylene glycol, di-ethyl pyrocarbonate, menadione sodium bisulfite (vitamin K).

While the meat portion of the product of this invention may itself contain egg as a flavorant, it has been found that the ability to prepare an egg and meat intermediate-moisture animal food containing a significant, detectable, identifiable egg component may be achieved only through the process of this invention which involves the separate preparation of an intermediate-moisture portion containing a significant amount of the egg. This intermediate-moisture egg portion is then combined with the above described intermediate-moisture meat portion in desired ratios to result in a highly palatable, nutritious, full-feeding animal food.

The separately prepared egg portion of the product of this invention will contain anywhere from 5 to 45 percent egg by weight, typically from 20–35 percent.

While proteinaceous meaty materials need not be excluded from the egg portion entirely, it is preferable to do so in order not to interfere with or mask the production of a portion identifiable as egg and which when combined with the above-described meat portion will retain its distinct, discernible identity. In any event, meaty materials in the egg portion should not exceed about 10 percent by weight and preferably about 5 percent by weight.

Thus, the major ingredients of the egg portion will be the egg itself, the preservation system, water and a vegetable protein source such as earlier described.

The egg portion of the egg and meat animal food is formulated so as to result in a product moisture content of from about 15 to 30 percent by weight preferably from 20–30 percent and most preferably from 25 to 27 percent by weight. The absence of a substantial amount of proteinaceous meaty materials, which as described earlier will typically contribute such a moisture in and of itself to the meat portion of the animal food product, requires the overt addition of water to achieve the intermediate-moisture content in the egg portion. Depending upon the amount, if any, of meaty materials in the egg portion, water will be added at a level of anywhere from 10 to 40 percent by weight of the egg portion and typically from 20–30 percent. It is considered within the skill of art workers in this area to determine the requisite amount of added water needed to result in a final product moisture content of from 15–30 percent, allowing for the possibility of lost water during processing.

The preservative system for the egg portion is as described earlier with respect to the meat portion of the meat and egg product of this invention. Namely, the water soluble solutes are present in a bacteriostatic amount typically greater than or equal to the moisture content of the egg product and generally from 15–35 percent by weight of the egg portion.

The pH of the egg portion is from 6.0 to 8.0, again it being found that achievement of such a pH will not normally require the overt addition of acid or alkali to the egg product.

The vegetable protein source is such as earlier described and is an essential component of the egg portion. The amount of this ingredient or ingredients in the egg portion will typically range from 5 percent to 50 percent by weight with the most preferred range being from about 9 to 20 percent by weight.

The essential egg ingredient is typically present in the egg portion in the range of about 5 to 45 percent by weight, and preferably from 20 to 40 percent, most preferably from 34–38 percent by weight. "Egg" in accordance with this invention broadly encompasses any and all egg products, for example, dried powdered egg, hard boiled eggs, raw eggs, egg yolks, dried egg yolks and the like. In the preferred embodiment of this invention, whole dried egg is used so as to obtain the full nutritional and flavor values imparted thereby.

A further essential, though minor, ingredient is a binder material, it being found that the absence of a significant amount of meaty materials in the egg portion renders the various ingredients of the product somewhat loosely bound and susceptible to segregation. The binder material may be any of those well-known in the art such as egg albumin, starch, sodium carboxymethylcellulose, gelatin and the like. The binder is generally present at a level of about 0.1 percent by weight to about 2.0 percent by weight.

The balance of the egg portion will optionally, though preferably, contain the earlier described ration-balancing protein supplement together with various vitamins, minerals, flavorants, and colors, typically yellow. The egg portion will preferably contain texturizers and an antimycotic such as described earlier with respect to the meat portion.

In preparing the separate egg and meat portions of this invention, substantially the same technique is employed for each and is substantially similar to that disclosed in Burgess, et al U.S. Pat. No. 3,202,514.

Using the egg portion as an example, the liquid components (e.g. water, polyols) and the dry components (e.g. egg, protein source, binder) are separately mixed and metered into a suitable mixing device wherein the mixture is then typically heated in excess of 150°F at atmospheric conditions and preferably at temperatures not exceeding about 250°F. The mixing step insures the proper dispersion of the water soluble solutes throughout the aqueous phase of the product. The mixture is then cooled and shaped to a desired form. Typically, the mixture will be processed through an extruder and issued through one or more dies of desired size and shape generally in an elongated cylindrical form.

In the preferred process of this invention, both the liquid and dry components of a particular portion are preheated to above about 150°F prior to metering them together in a mixing device where further heat is applied to the mixture.

In all embodiments, the cooking of the ingredients should not be so prolonged as to cause degradation of the various components. Typical overall cooking times will range anywhere from 5 to 20 minutes.

Apart from the use of egg as the animal food flavorant and its ability to impart sufficient nutritional values of its own to more than offset for the deletion of any components necessitated by its use, a significant key to the present invention is the separate formulation and processing of the egg and meat portions and their final blending. Attempts to merely include egg in the ingredient portion of standard prior-art meat based animal foods totally fails to yield an animal food having a noticeable, identifiable egg component. Further, adding egg to an otherwise completely formulated and formed meat-based intermediate-moisture animal food similarly fails in material respects. While this does provide the distinct noticeable egg character to the product, the egg is difficult to bind or adhere to the meat product. More importantly, the bacteriostatic preservative system of the base meat product is insufficient to stabilize the egg itself such that it remains in a mold free shelf-stable condition.

Even methods calling for separate mixing and processing of an intermediate-moisture egg portion and an intermediate-moisture meat portion fail in providing a final product having distinct, discernible meat and egg portions if they are ultimately intimately mixed together prior to packaging. Too substantial an interaction between the two portions and their ingredients may result in a final product resembling neither. For example, interaction between the red colorings of the meat portion and yellow colorings of the egg portion will have an obvious adverse effect on the desirability of the final product.

Accordingly, the process of this invention provides for the separate preparation of two distinct, complete shelf-stable intermediate-moisture portions which are blended together in desired ratios in a manner which avoids a loss of identity of each individual portion. The advantages of such a process are apparent. First, the ultimate product provides a unique appearance in the provision of an identifiable flavoring component. Secondly, the provision of two independently shelf-stable products insures the shelf-stability of the final product. Thirdly, the intermediate-moisture character of each portion renders them more readily bindable in a final product.

In the preferred embodiment of this invention, the separately prepared meat and egg portions are extruded into thin cylindrical forms resembling filaments and are cut to a predetermined length. The separate products are then combined and pressed into a disc-like shape and packaged in accordance with the teachings of U.S. Pat. No. 3,202,514 to Burgess, et al with respect to their meat-based animal food. The two separately prepared components may be blended at any desired ration, typically from 50 to 90 percent meat portion to 10 to 50 percent egg portion on a weight basis. A preferred ration for combination is about 70:30 meat to egg portion on a weight basis.

The following example will serve to more fully illustrate the preferred mode of this invention.

EXAMPLE

A fully nutritious meat and egg intermediate moisture animal food is prepared as follows.

Meat Portion — The meat portion is prepared using those ingredients set forth in Example IV of U.S. Pat. No. 3,202,514 to Burgess, et al. The liquid ingredients were mixed together and heated to about 190°F for about 10 minutes and then metered into a secondary mixer/cooker with the remaining non-aqueous ingredients and heated to about 190°F for 10 minutes. The mixture was then cooled to about 70°F and extruded through a low temperature low pressure Enterprise extruder having a round 0.1875 inch diameter nozzle. The extruded strands were cut in lengths of about one-half inch. The moisture content of the extrudate was 21 percent and a pH of 6.8.

Egg Portion — The following ingredients are utilized in this portion.

|  | Percent by Weight |
| --- | --- |
| Dried whole egg | 33.6 |
| Water | 27.0 |
| Sucrose | 15.5 |
| Soy Protein Concentrate | 6.5 |
| Propylene glycol | 4.55 |
| Wheat flour | 2.73 |
| Soy flour | 2.20 |

-continued

|  | Percent by Weight |
| --- | --- |
| Starch | 1.82 |
| Whey | 0.91 |
| CMC | 0.45 |
| Salt | 1.14 |
| Minerals, vitamins, colorings | 0.64 |
| Potassium sorbate | 0.15 |
| Calcium phosphate supplement | 2.81 |

The aqueous components are mixed and heated to about 185°–190°F for 10 minutes and then metered together with the remaining ingredients in a secondary mixer with heating at 190°F for about 5–10 minutes. The mixture was then cooled to 70°F and extruded in the same manner as described above for the meat portion. The moisture content of the extrudate was 22.5 percent and the pH was 6.8.

The meat extrudate and egg extrudate were then blended together in a weight ratio of 85:15 with minimal mixing. The mixture was formed into a disc-like patty having a diameter of about 3-½ inches and a thickness of about three-quarters of an inch. This product was then packaged in a moisture-impermeable cellophane wrapper.

The product did not undergo any degree of bacterial decomposition even after an ambient storage period of 6 months. The animal food was highly palatable when fed to dogs and possessed a desirable mixture of distinct, identifiable meat and egg portions.

It is preferred in practicing the process of this invention to prepare the separate egg and meat portions such that their pH and moisture content are relatively the same prior to the mixing thereof.

Through this invention, it is now possible to prepare an intermediate-moisture animal food having a palatability improving component yet which provides a fully-balanced, highly nutritional ration. Further, the process of this invention makes it possible to provide a unique product appearance which heightens palatability and consumer appeal.

While the foregoing invention has been described with respect to certain preferred embodiments and illustrative examples, it will be understood that various modifications and improvements are believed ascertainable to those skilled in this art without departing from the scope and spirit of this invention as defined by the appended claims.

We claim:

1. A process for preparing a shelf-stable, intermediate-moisture meat and egg animal food adapted to be packaged without resort to sterilization or refrigeration, said animal food having a moisture content of from 15 percent to 30 percent and having a substantially neutral pH of from about 6.0 to 8.0, comprising:
  a. forming a mixture of proteinaceous meaty materials and water soluble solutes, principally sugar in an amount sufficient to impart bacteriostasis to said mixture, and heating said mix at a temperature above about 150°F to prepare a first shelf-stable meat component having a moisture content of 15 percent to 30 percent, a pH of from about 6.0 to 8.0, and sugar from 15 percent to 35 percent by weight;
  b. extruding the meat component prepared in (a) to desired shape;
  c. forming a mixture of 5 percent – 45 percent egg on a dry basis, 10 to 40 percent added water, 5 percent – 50 percent vegetable protein, an effective level of an edible binder material, and water soluble solutes, principally sugar in an amount sufficient to impart bacteriostasis to said mixture and heating said mixture at a temperature above about 150°F to prepare a second shelf-stable egg component having a moisture content of 15 percent to 30 percent, a pH of from about 6.0 to 8.0, and sugar from 15 percent to 35 percent by weight;
  d. extruding the egg component prepared in (c) to desired shape;
  e. blending said meat component and said egg component in desired ratios in a manner which avoids a substantial loss of identity of each component; and
  f. pressing said mixture of (c) whereby the meat and egg components are bound together into a desired shape.

2. The process of claim 1 wherein said meat component further includes a vegetable protein source.

3. The process of claim 2 wherein said meat and egg components further include an amount of an edible antimycotic effective to retain each of said components in a mold free condition.

4. The process of claim 3 wherein said meat component and said egg component are formulated so as to have a substantially similar pH and moisture content prior to the blending thereof.

5. The process of claim 4 wherein the liquid ingredients of the meat component are separately heated to above about 150°F prior to mixing and heating with the remaining ingredients.

6. The process of claim 5 wherein the weight percent of water soluble solutes in each component is at least equal to the moisture content.

7. A shelf-stable nutritionally-balanced intermediate-moisture egg and meat animal food product having a moisture content of 15 to 30 percent by weight and a pH of from 6.0 to 8.0 possessing a distinct, identifiable egg component, comprising a mixture of
  a. from 50–90 percent of a shelf-stable intermediate-moisture meat component having a moisture content of 15 to 30 percent by weight and a pH of 6.0 to 8.0 comprising a pasteurized matrix of proteinaceous meaty materials normally capable of supporting bacteriological growth having 15–35 percent by weight of an aqueous solution of water soluble solutes, principally sugar uniformly dispersed throughout said matrix, and an effective level of an edible antimycotic in contact with said matrix materials; and
  b. from 10–50 percent of a shelf-stable intermediate-moisture egg component having a moisture content of 15 to 30 percent by weight and a pH of 6.0 to 8.0 comprising a pasteurized matrix of 5 to 45 percent egg on a dry basis by weight and 5–50 percent vegetable protein source and an edible binder, said matrix normally capable of supporting bacteriological growth, and having 15 to 35 percent by weight of an aqueous solution of water soluble solutes, principally sugar uniformly dispersed throughout said matrix, and an effective level of an edible antimycotic in contact with said matrix materials;
wherein the meat and egg components are coherently pressed into a desired shape.

8. The product of claim 7 wherein said edible binder of said egg component is sodium carboxymethylcellulose.

9. The product of claim 7 wherein said meat component and said egg component are present in a weight ration of 70:30 respectively.

* * * * *

UNITED STATES PATENT AND TRADEMARK OFFICE
CERTIFICATE OF CORRECTION

PATENT NO. : 4,001,449
DATED : January 4, 1977
INVENTOR(S) : Eugene H. Reardanz et al It is certified that error appears in the above-identified patent and that said Letters Patent are hereby corrected as shown below:

Column 5, line 43, "along" should read -- alone --.

Column 10, Claim 1, line 14, "(c)" should read -- (e) --.

Signed and Sealed this

Thirteenth Day of September 1977

[SEAL]

Attest:

RUTH C. MASON
Attesting Officer

LUTRELLE F. PARKER
Acting Commissioner of Patents and Trademarks